US012675287B2

(12) United States Patent　　(10) Patent No.: US 12,675,287 B2
Koletar et al.　　(45) Date of Patent:　　Jul. 7, 2026

(54) VALIDATING, AGGREGATING, AND TRANSLATING CONFIGURATION CODE

(71) Applicant: Target Brands, Inc., Minneapolis, MN (US)

(72) Inventors: Jeremy Koletar, Minneapolis, MN (US); Praba Siva, Minneapolis, MN (US); Tyler Liddicoat, Minneapolis, MN (US); Soumen Choudhury, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 302 days.

(21) Appl. No.: 18/352,107

(22) Filed: Jul. 13, 2023

(65) Prior Publication Data

US 2024/0053982 A1　　Feb. 15, 2024

Related U.S. Application Data

(60) Provisional application No. 63/396,389, filed on Aug. 9, 2022.

(51) Int. Cl.
　　*G06F 9/44*　　　　(2018.01)
　　*G06F 8/40*　　　　(2018.01)
　　*G06F 8/71*　　　　(2018.01)
(52) U.S. Cl.
　　CPC . *G06F 8/71* (2013.01); *G06F 8/40* (2013.01)
(58) Field of Classification Search
　　None
　　See application file for complete search history.

(56) References Cited

U.S. PATENT DOCUMENTS

| | | | |
|---|---|---|---|
| 7,428,540 B1 * | 9/2008 | Coates | G06F 16/182 |
| 9,122,770 B2 | 9/2015 | Murphy et al. | |
| 9,992,260 B1 * | 6/2018 | McMullen | H04L 67/34 |
| 10,700,945 B2 | 6/2020 | Varney et al. | |
| 10,708,272 B1 * | 7/2020 | Holbrook | H04L 9/0643 |
| 10,924,346 B1 | 2/2021 | Banerjee et al. | |

(Continued)

OTHER PUBLICATIONS

Sanjay Gadge et al., "Microservice Architecture: API Gateway Considerations", 2017 (Year: 2017).*

(Continued)

*Primary Examiner* — Lanny N Ung
(74) *Attorney, Agent, or Firm* — Barnes & Thornburg LLP

(57) ABSTRACT

In some implementations, a method performed by data processing apparatuses includes determining that a change has been made to interface configuration code of a service-providing platform. In response to determining that the change has been made, each interface configuration code unit of the interface configuration code of the platform can be validated. In response to successful validation of all of the interface configuration code units, an aggregated configuration code unit can be generated that includes computer code of each of the interface configuration code units, the aggregated configuration code unit can be translated into a computer language that is different from that of the interface configuration code units, and a translated configuration code unit can be generated. The translated configuration code unit can be used to configure the multiple different services of the platform.

22 Claims, 8 Drawing Sheets

(56) References Cited

U.S. PATENT DOCUMENTS

| | | | | |
|---|---|---|---|---|
| 11,093,232 | B2 * | 8/2021 | Maréchal | G06F 11/3688 |
| 2008/0295085 | A1 * | 11/2008 | Rachamadugu | G06F 8/75 |
| | | | | 717/159 |
| 2012/0185925 | A1 * | 7/2012 | Barkie | G06F 21/572 |
| | | | | 726/7 |
| 2016/0092344 | A1 * | 3/2016 | Bally | G06F 11/3684 |
| | | | | 717/124 |
| 2017/0201416 | A1 | 7/2017 | McMullen | |
| 2017/0257453 | A1 | 9/2017 | McMullen | |
| 2019/0272179 | A1 * | 9/2019 | McMullen | G06F 8/41 |
| 2020/0366689 | A1 * | 11/2020 | Lotia | H04L 63/1483 |
| 2022/0294689 | A1 * | 9/2022 | Brocato | H04L 41/0886 |

OTHER PUBLICATIONS

"A Microservices Implementation Journey Part 4", accessed at https://koukia.ca/a-microservices-implementation-journey-part-4-9c19a16385e9 on Mar. 22, 2022, 24 pages.
"Introduction to KrakenD", accessed at https://www.krakend.io/docs/overview/introduction/ on Mar. 22, 2022, 4 pages.
"MuleSoft Documentation—Anypoint API Manager, MuleSoft Documentation", accessed at https://docs.mulesoft.com/api-manager/2.x/latest-overview-concept on Mar. 22, 2022, 9 pages.
Axway Blog, "What is API Lifecycle Management?", accessed at https://blog.axway.com/amplify-products/api-management/api-lifecycle-management on Mar. 22, 2022, 4 pages.
CMS Wire, "15 API Management Platforms That Make the Short List", accessed at https://www.cmswire.com/information-management/15-api-management-platforms-that-make-the-short-list/ on Mar. 22, 2022, 7 pages.
Snapt, "Why You Need An API Gateway", accessed at https://www.snapt.net/blog/why-you-need-an-api-gateway-to-manage-access-to-your-apis on Mar. 22, 2022, 9 pages.

* cited by examiner

300

```
                    ┌─────────────────┐
                    │     Start       │
                    │            302  │
                    └────────┬────────┘
                             │
                             ▼
                        ╱ Is Syntax ╲
                       ╱   Correct?   ╲──── No ──────────────┐
                       ╲      304     ╱                      │
                        ╲            ╱                       │
                             │ Yes                           │
                             ▼                               │
                       ╱ Are Settings ╲                      │
                      ╱   Supported?   ╲──── No ─────────────┤
                      ╲       306      ╱                     │
                       ╲              ╱                      │
                             │ Yes                           │
                             ▼                               │
                       ╱  Are Settings ╲                     │
                      ╱    Mutually     ╲──── Yes ───────────┤
                      ╲    Exclusive?   ╱                    │
                       ╲      308      ╱                     │
                             │ No                            │
                             ▼                               │
                       ╱  Have ACLs   ╲                      │
                      ╱ Been Defined?  ╲──── No ─────────────┤
                      ╲       310      ╱                     │
                       ╲              ╱                      │
                             │ Yes                           │
                             ▼                               │
                       ╱  Have Error  ╲                      │
                      ╱  Codes Been    ╲──── No ─────────────┤
                      ╲   Specified?   ╱                     │
                       ╲      312      ╱                     │
                             │ Yes                           │
                             ▼                               ▼
                    ┌─────────────────┐          ┌─────────────────┐
                    │     Pass        │          │     Fail        │
                    │            314  │          │            316  │
                    └─────────────────┘          └─────────────────┘
```

| Setting | Description | Mutual Exclusion |
|---|---|---|
| acl | An acl, valid for the environment, which is to be matched by the client IP | Mutually exclusive with not_acl |
| not_acl | An acl, valid for the environment, which is not to be matched by the client IP | Mutually exclusive with acl |
| url_path | A regular expression, which is to be matched by the requested URL path | Mutually exclusive with not_url_path |
| not_url_path | A regular expression, which is not to be matched by the requested URL path | Mutually exclusive with url_path |
| request_method | A valid HTTP request method (e.g., GET, POST, etc.) | |
| api_key | An API key which is to have been provided in the request | |

```
{
        "url_path": "/restricted/path",
        "acl": "ServiceX_IP"
}
```

*502*

```
{
        "not_url_path": "/restricted/path"
}
```

*504*

```
{
        "api_key": "Key123",
        "not_acl": "ServiceX_IP"
}
```

*506*

```
{
        "request_method": "GET"
}
```

```
{
        "id": "ServiceA",
        "allow": [
                {"request_method": "GET", "url_path": "/foo"},
                {"request_method": "OPTIONS", "url_path": "/foo"}
        ],
        "restriction_error_code": 403
}
```

522

```
{
        "id": "ServiceB",
        "block": [
                {"url_path": "private"},
        ],
        "restriction_error_code": 404
}
```

524

```
{
        "id": "ServiceN",
        "allow": [
                {"api_key": "123"},
                {"api_key": "456"},
                {"api_key": "789"}
        ],
        "restriction_error_code": 403
}
```

```
{
        "id": "ServiceX",
        "allow": [
                {
                        "url_path": "/application_path",
                        "acl": "ServiceX_IP"
                },
                {

"url_path": "/application_path",
                        "acl": "ApplicationAllowed"
                },
                {

"not_url_path": "/application_path"
                }
        ],
        "restriction_error_code": 404

}
```

542

```
if (req.url.path == "/application_path" && (client.ip !~ ServiceX_IP &&
client.ip !~ ApplicationAllowed {
        error 374 "NOT FOUND";
}
```

FIG. 5C

VALIDATING, AGGREGATING, AND TRANSLATING CONFIGURATION CODE

CROSS REFERENCE TO RELATED APPLICATION

This application claims the benefit of U.S. Provisional Patent Application Ser. No. 63/393,689, filed on Jul. 29, 2022, the entire contents of which are incorporated herein by reference.

TECHNICAL FIELD

This specification generally relates to validating, aggregating, and translating configuration code, such as code used to configure services provided by a content delivery network.

BACKGROUND

Content delivery networks (CDNs) are distributed networks of servers that deliver content to end users over the Internet. In general, requests for content are directed to network nodes that can optimally serve content, such as edge servers that are physically close to a user computing device. CDNs can be configured by content providers though various settings that specify which resources are to be publicly exposed, which users are to be granted access or blocked, which system calls are to be allowed, where particular network traffic is forwarded or redirected, and so forth. For example, CDNs can route (or block) network traffic to appropriate services and systems, some of which may be internal within an organization and others which may be external and provided by third parties, based on configurations that are uploaded to the CDNs. One example of CDN configuration can include the use of a configuration file in the Varnish Configuration Language (VCL), which can be converted into C, compiled, and uploaded to CDNs for runtime processing.

SUMMARY

This document generally describes computer systems, processes, program products, and devices for validating, aggregating, and translating configuration code, such as code used to configure services provided by a content delivery network (CDN). In general, a CDN platform can centralize network traffic routing and content-related services offered by various different groups of an organization within a single configuration resource. For example, conventionally such CDN configurations have been maintained in a single flat file (e.g., single VCL configuration file) that would be accessed and updated by multiple different groups within an organization. However, allowing each group to directly modify low-level code (which may be outside of the group's domain knowledge) that specifies configuration settings used by the CDN to implement services for the entire organization, for example, may lead to a significant amount of duplicate code, poorly maintained code, code errors, and unattributed/unowned code segments that are challenging to maintain (i.e., reluctance to delete any existing code in case used by group, but unclear whether still used or potential for security vulnerability). Instead, translation layer technology disclosed throughout this document can be used in which each group separately maintains a discrete configuration code unit (in a higher-level language) that specifies configuration settings used by the CDN to implement services for the respective group. When changes have been made to any of the separately maintained configuration code units, a validation process is performed on the code, and when the code is valid, the code is aggregated and translated into the low-level language used by the CDN to implement the services. A variety of advantages are provided by separating the specification (e.g., the high-level code units) from the implementation (e.g., the low-level code used by the CDN), such as improving the maintainability, performance, security, and flexibility of the system.

In some implementations, a method performed by data processing apparatuses includes determining that a change has been made to interface configuration code of a platform. The platform can be configured to provide multiple different services, and the interface configuration code can include, for each service of the platform, a respective interface configuration code unit that specifies configuration settings for the service. In response to determining that the change has been made to the interface configuration code of the platform, each interface configuration code unit of the interface configuration code of the platform can be validated. In response to successful validation of all of the interface configuration code units, an aggregated configuration code unit can be generated that includes computer code of each of the interface configuration code units, the aggregated configuration code unit can be translated into a computer language that is different from that of the interface configuration code units, and based on translating the aggregated configuration code unit, a translated configuration code unit can be generated. The translated configuration code unit can be used to configure the multiple different services of the platform.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can include any, all, or none of the following features. The platform can be a content delivery network platform, and the configuration settings for each service can be used to allow or block requests for content that are handled for the service by the platform. Each interface configuration code unit of the interface configuration code can be maintained in a different, uniquely named file, of a common network directory. Validating each interface configuration code unit can include determining whether computer code of the interface configuration code unit has a valid syntax. Validating each interface configuration code unit can include determining, for the interface configuration code unit, whether each configuration setting specified by the interface configuration code unit is included in a set of supported configuration settings for the platform. The set of supported configuration settings for the platform can be a subset of all configurations settings that are available in a computer language of the interface configuration code unit. Each interface configuration code unit for each service of the platform can include at least one request matcher. A given request matcher for a given service can be defined by one or more configuration settings. Validating each interface configuration code unit can include determining, for the interface configuration code unit, whether at least two different configuration settings used to define a same request matcher are mutually exclusive. Validating each interface configuration code unit can include determining, for the interface configuration code unit, whether each access control list specified by the interface configuration code unit has been defined as a valid access control list. The translated configuration code unit can include computer code of a lower-level language than that of each of the interface configuration code units.

The systems, devices, program products, and processes described throughout this document can, in some instances, provide one or more of the following advantages. By separating configuration settings specified in high-level code units from the implementation detailed in translated low-level code, code maintainability and flexibility is improved. Each group of an organization can configure their own service, without having to communicate their changes to the other groups. Code developers are freed from the potentially burdensome task of having to understand and debug a monolithic code file that is being worked on by other code developers. A size of a code base used by a platform server can be reduced by eliminating redundant code. Unique API names can be ensured by leveraging file naming conventions of a network directory in which code files are stored, thus preventing potential naming clashes at a platform server. A subset of settings available from a platform server can be supported, thus simplifying an API configuration process.

Other features, aspects and potential advantages will be apparent from the accompanying description and figures.

DESCRIPTION OF DRAWINGS

FIG. 3 shows an example process for validating configuration code.

FIG. 4 shows an example set of supported configuration settings for platform services.

FIGS. 5A-C show examples of configuration code.

Like reference symbols in the various drawings indicate like elements

DETAILED DESCRIPTION

This document describes technology that can validate, aggregate, and translate configuration code, such as code used to configure services provided by a content delivery network (CDN). In general, CDN platforms can provide content-related services offered by various different groups of an organization. If each group were to directly modify low-level code that specifies configuration settings used by the CDN to implement platform services for the entire organization, for example, a significant amount of duplicate code, poorly maintained code, and code errors may result. To improve the reliability and the maintainability of the configuration code, for example, translation layer technology can be used in which each group separately maintains a discrete configuration code unit (e.g., in a higher-level programming language) that specifies configuration settings used by the CDN to implement services for the respective group. In response to detected code changes, a validation process is performed on the code, and the validated code is aggregated and translated into the low-level language used by the CDN to implement the services. By separating the specification (e.g., the high-level code units) from the implementation (e.g., the low-level code used by the CDN), code maintainability and flexibility is improved.

Figure 1:
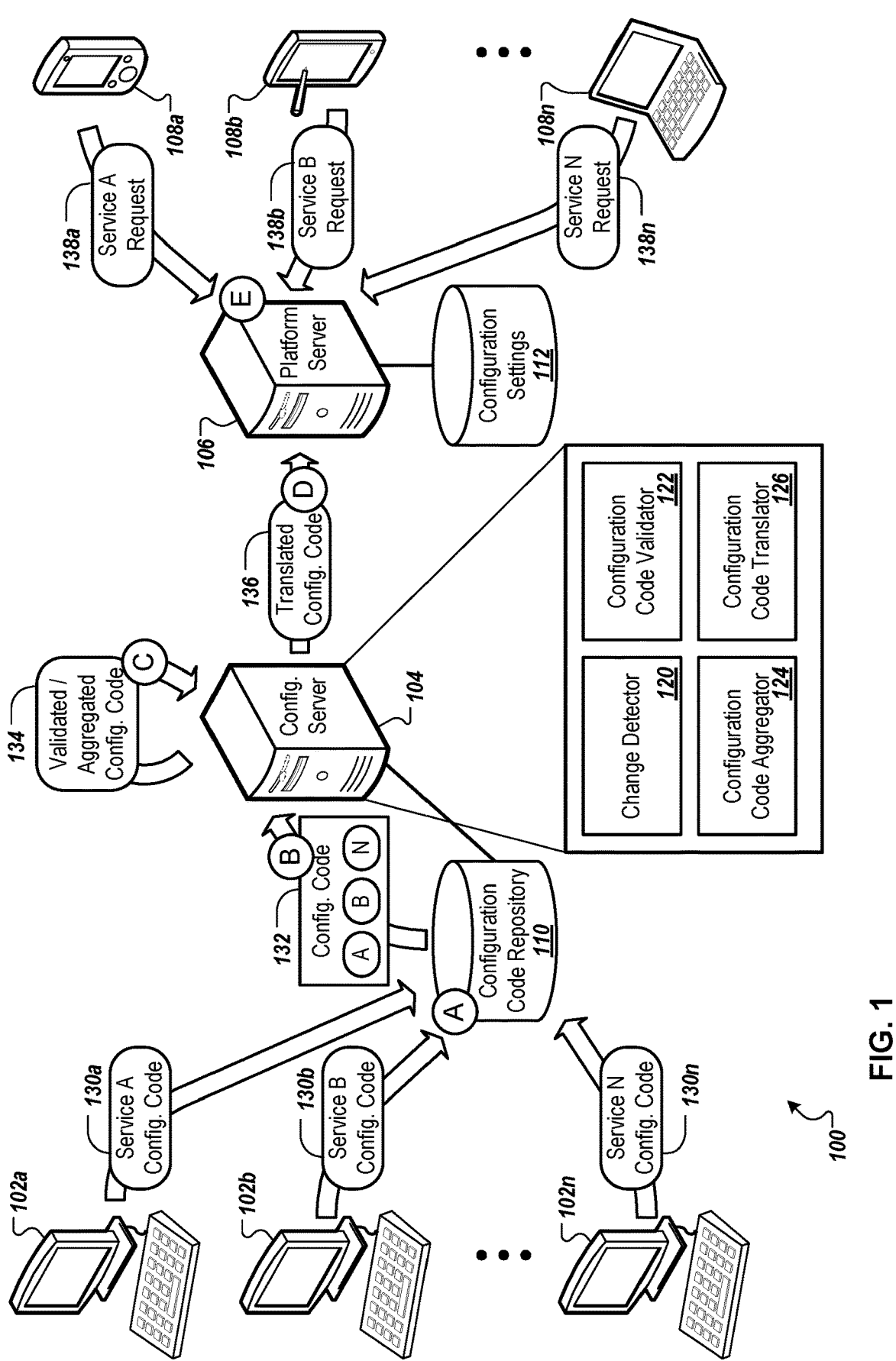
FIG. 1 is a conceptual drawing of an example system for validating, aggregating, and translating configuration code.

FIG. 1 is a conceptual drawing of an example system 100 for validating, aggregating, and translating configuration code, as represented in example stages (A) to (E). Stages (A) to (E) may occur in the illustrated sequence, or they may occur in a sequence that is different than in the illustrated sequence, and/or two or more stages (A) to (E) may be concurrent. In some examples, one or more stages (A) to (E) may be repeated multiple times while validating, aggregating, and translating configuration code.

In the depicted example, the system 100 includes multiple code generation devices 102a-n. The code generation devices 102a-n, for example, can be various forms of stationary or mobile computing devices including, but not limited to a desktop computer, a laptop computer, a tablet computer, a personal digital assistant (PDA), a smartphone, or another sort of computing device. In the present example, each of the code generation devices 102a-n can be operated by a representative (e.g., a computer code developer) of a different group of an organization. The organization, for example, can be an organized collection of individuals with a particular purpose, such as a business, a society, an association, or another sort of organization. Each of the groups, for example, can include individuals of the organization who tend to work together, such as members of a business unit, a division, a department, or another sort of organizational group. In general, an organization can employ a platform server 106 (e.g., a CDN platform including one or more computing servers) to deliver content and services on behalf of the organization, over one or more networks (e.g., the Internet), to various end users (e.g., customers, vendors, members of the organization, the general public, etc.). Each group of the organization, for example, can be responsible for specifying content and services to be provided to the end users via the platform server 106, according to the objectives of the group. In the depicted example, the system 100 includes multiple user devices 108a-n (e.g., various forms of stationary or mobile computing devices, such as desktop computers, laptop computers, tablet computers, PDAs, smartphones, etc.) that can request content and services from the platform server 106, which can in turn fulfill the requests based on the specifications of the various organizational groups.

During stage (A), for example, each of the code generation devices 102a-n can be used to generate and/or modify code for configuring a respective interface (e.g., an application programming interface (API)) of a respective service provided by the platform server 106. The platform server 106, for example, can be configured to provide multiple different services, each service being managed by a different group (e.g., a business unit, a division, a department, or another sort of group) of an organization (e.g., business, a society, an association, or another sort of organization). In the present example, the platform server 106 (e.g., a CDN platform) can be configured to provide Service A, Service B, and Service N—with configuration settings for Service A being specified through code generation device 102a, configuration settings for Service B being specified through code generation device 102b, and configuration settings for Service N being specified through code generation device 102n. The respective configuration settings for Services A, B, and N, for example, can generally be used by the platform

106 to allow or block requests for content that are handled for the respective service by the platform, without impacting the operations of the other services. Each group of an organization, for example, can be responsible configuring their own service, without having to communicate their changes to the other groups.

Configuration settings specified by the various different groups for the respective platform services can be maintained in a repository. In the present example, an interface configuration code unit 130*a* (e.g., including configuration settings for Service A), an interface configuration code unit 130*b* (e.g., including configuration settings for Service B), and an interface configuration code unit 130*n* (e.g., including configuration settings for Service N) can each be maintained in a configuration code repository 110. Each of the interface configuration code units 130*a-n*, for example, can include a collection of settings for configuring a respective service interface of the platform server 106, and/or may include fully formed code modules. In general, various different types of configuration code repositories may be implemented in different examples. In some implementations, the configuration code repository 110 can be (or can include) a source code repository system. For example, each of the interface configuration code units 130*a-n* can be a different resource that is hosted by the configuration code repository 110, and can include configuration settings for an API of a respective service provided by the platform server 106. Version control techniques can be used to manage changes to, and additions/deletions of the interface configuration code units 130*a-n*, for example. In some implementations, the configuration code repository 110 can be (or can include) a file-based repository. For example, each of the interface configuration code units 130*a-n* can be a different, uniquely named file, and the configuration code repository 110 can be a network directory that stores the files. The name of each file, for example, can correspond to the API for the service to be configured using the settings specified in the file. As each file in the directory has a unique name (e.g., as enforced by an operating system), unique API names are ensured, thus preventing potential naming clashes at the platform server 106. In some implementations, the configuration code repository 110 can be (or can include) a database repository. For example, each of the interface configuration code units 130*a-n* can be maintained in a separate data record (or set of data records) of the configuration code repository 110.

Figure 2:
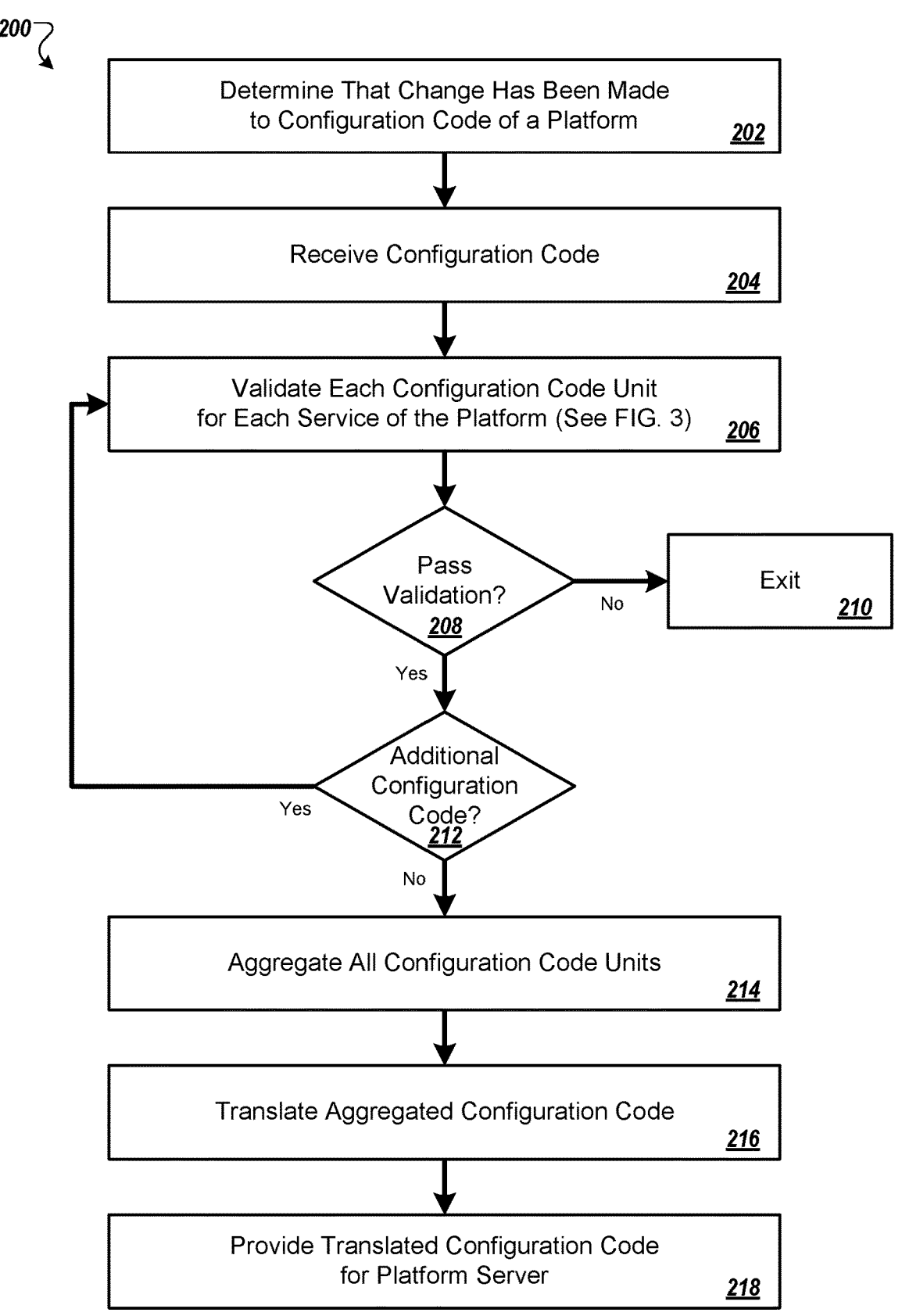
FIG. 2 shows an example process for validating, aggregating, and translating configuration code.

Referring now to FIG. 2, an example process 200 for validating, aggregating, and translating configuration code is shown. The process 200 can be performed by components in the system 100, for example, and will be described with reference to FIG. 1. However, other systems may be used to perform the same or a similar process. Operations of the process 200 may occur in the illustrated sequence, or they may occur in a sequence that is different than in the illustrated sequence, and/or two or more operations may be concurrent. For example, two or more code units may be validated concurrently. As another example, code units may be aggregated before validation, or may be aggregated as the code units are being validated.

A determination can be performed that a change has been made to configuration code of a platform (202). For example, a configuration server 104 (e.g., a computing server system that includes or is in communication with the configuration code repository 110) can use a change detector 120 (e.g., an executable application) to monitor the configuration code repository 110 for additions of new configuration code units, for modifications to existing configuration code units, and for deletions of configuration code units. In some implementations, determining that a change has been made to interface configuration code can include receiving a notification from a configuration code repository. For example, if the configuration code repository is (or includes) a source code repository system, the source code repository system can notify the change detector 120 of the configuration server 104 when any additions, modifications, or deletions have been made to the interface configuration code for the platform server 106. In some implementations, determining that a change has been made to interface configuration code can include actively polling a configuration code repository for changes. For example, the configuration server 104 can use the change detector 120 to compare a current state of the configuration code repository 110 (e.g., a source code repository, a file-based repository, a database repository, or another suitable repository) with a previous state of the repository to determine when changes have been made to any of the interface configuration code units 130*a-n* in the repository.

During stage (B), in response to determining that a change has been made to any of the interface configuration code units, the configuration code can be received (204). In the present example, the configuration server 104 can receive, from the configuration code repository 110, configuration code 132 that includes each of the interface configuration code units 130*a-n*. In implementations in which the configuration code repository 110 is a file-based repository, for example, the configuration server 104 can access a directory (or multiple directories) containing source code files that pertain to the configuration code units 130*a-n*, and can retrieve the files. In implementations in which the code repository 110 is a database repository, for example, the configuration server 104 can access a database containing source code that pertains to the configuration code units 130*a-n*, and can retrieve data that includes the source code.

During stage (C), each configuration code unit of each service of the platform can be validated (206) and aggregated (214). For example, the configuration server 104 can use a configuration code validator 122 and a configuration code aggregator 124 (e.g., separate executable applications for each operation, or a single executable application that performs a combined operation) to validate and aggregate each of the configuration code units 130*a-n*. In the present example, if a given configuration code unit passes validation (208), a determination can be performed of whether additional configuration code units exist (212), and the validation process can repeat until all of the configuration code units have been validated, before performing the aggregation process (214). Alternately, each configuration code unit can be iteratively aggregated with previously validated configuration code units immediately after the code unit passes validation. In either implementation, the process can exit (210) if any of the configuration code units do not pass validation, and an error log can be provided to an operator so that the configuration code units can be appropriately fixed.

Referring now to FIG. 3, an example process 300 for validating configuration code is shown in further detail. The process 300 can be performed by components in the system 100, for example, and will be described with reference to FIG. 1. However, other systems may be used to perform the same or a similar process. Operations of the process 300 may occur in the illustrated sequence, or they may occur in a sequence that is different than in the illustrated sequence, and/or two or more operations may be concurrent. When the process for validating a configuration code unit begins (302), for example, various validation criteria can be applied to each configuration code unit, sequentially or in parallel.

A determination can be performed of whether the syntax of the configuration code unit is correct (304). For example, the configuration code validator 122 can be used to validate the syntax of the interface configuration code unit 130a. If the syntax is incorrect, for example, the configuration code unit fails the validation process (316).

A determination can be performed of whether the settings specified in the configuration code unit are included in a set of supported configuration settings for the platform (306). For example, the platform server 106 may offer a wide array of different available settings for configuring APIs of services provided by the platform, however only a subset of the settings may be suitable for services of a particular organization and thus supported by the configuration server 104. Referring to FIG. 4, an example set of supported configuration settings 400 for platform services is shown. In the present example, the supported settings include acl, not_acl, url_path, not_url_path, request_method, and api_key. More or fewer supported settings are possible in other examples. The setting "acl", for example, specifies an access control list (ACL) that is valid for the environment and is to be matched by the Internet Protocol (IP) address of a client device (e.g., one of the user devices 108a-n) that makes a request to the platform server 106. The setting "not_acl", for example, specifies an ACL that is valid for the environment and is not to be matched by the IP address of a client device that makes a request to the platform server 106. The setting "url_path", for example, is a regular expression that is to be matched by a uniform resource locator (URL) path requested by the client device. The setting "not_url_path", for example, is a regular expression that is not to be matched by a URL path requested by the client device. The setting "request_method", for example, is a valid HyperText Transfer Protocol (HTTP) request method (e.g., GET, POST, OPTIONS, PATCH, DELETE, etc.) specified by the client device. The setting "api_key", for example, is an API key (e.g., a non-secret API key that is used to identify and tag callers of the API) which is to have been provided in the request by the client device. If any of the settings specified in the configuration code unit are not supported, for example, the configuration code unit fails the validation process (316).

In general, each interface configuration code unit for each platform service can include at least one request matcher that includes one or more supported configuration settings. Request matchers of a configuration code unit, for example, can be paired with either an allow or a block designation, and can be used to allow or block content requests by any of the user devices 108a-n. Referring now to FIG. 5A, example request matchers included in interface configuration code units are shown. Request matcher 500, for example, specifies that a URL path requested by a client device is to be "/restricted/path" and that the IP address of the client device is to be in an ACL list named "ServiceX_IP". Request matcher 502, for example, specifies that a URL path requested by a client device is not to be "/restricted/path". Request matcher 504, for example, specifies that an API key provided in a request by a client device is to be "Key123" and that the IP address of the client device is not to be in an ACL list named "ServiceX_IP". Request matcher 506, for example, specifies that a request method provided in a request by a client device is to be "GET". Other request matchers are possible, using supported configuration settings (or valid combinations of supported configuration settings).

A determination can be performed of whether any mutually exclusive settings specified in the configuration code unit are used in combination (308). In general, mutually exclusive settings are not to be used in combination when specifying a request matcher used to configure an API interface for a service. Referring again to FIG. 4, for example, the setting "ad" is mutually exclusive with "not_acl". As another example, the setting "url_path" is mutually exclusive with "not_url_path". If any mutually exclusive settings are used together in combination in a same request matcher, for example, the configuration code unit fails the validation process (316).

A determination can be performed of whether all access control lists (ACLs) specified in the configuration code unit have been defined as a valid access control list (310). In general, an access control list (ACL) can be an allow list (e.g., a list of IP address that may be granted access to content and/or services) or a block list (e.g., a list of IP addresses that may be denied access to content and/or services). An ACL, for example, can be predefined (e.g., in a hardcoded list and/or a separate source code file) by a representative of an organization, a representative of a group within the organization, and/or an operator of the configuration server 104. The ACL, for example, can be maintained in the configuration code repository 110, or another location that is accessible by the configuration server 104. If any ACLs specified in a configuration code unit are undefined, for example, the configuration code unit fails the validation process (316).

A determination can be performed of whether valid error codes have been specified in the configuration code unit (312). For example, if an API configuration specifies one or more request matchers for either an allow designation or a block designation, an error code is to be specified. If valid error codes are not specified, for example, the configuration code unit fails the validation process (316).

If the configuration code unit satisfies all of the validation criteria, the configuration code unit is designated as being valid (314), whereas if any of the validation criteria are unsatisfied, the configuration code unit fails the validation process (316). Referring now to FIG. 5B, for example, validated interface configuration code units 520, 522, and 524 (e.g., including JavaScript Object Notation (JSON) code) are shown. In general, each configuration code unit can include a code unit identifier, an allow designation or block designation, one or more request matchers, and a restriction error code. The identifier, for example, can be an API name, and can match the name of a file that stores the configuration code unit (e.g., for file-based implementations). The allow designation or block designation can designate whether content requests that match one or more requests matchers are to be allowed or blocked. The request matchers, for example, can specify one or more criteria that are to be satisfied in order for a content request to be allowed or blocked by a service. If an allow designation is included in a configuration code unit, for example, a content request that matches at least one request matcher of the configuration code unit will be allowed. If a block designation is included in a configuration code unit, for example, a content request that matches at least one request matcher of the configuration code unit will be blocked. The restriction error code, for example, can be an error code that is returned if a content request does not match at least one request matcher.

Configuration code unit 520, for example, can be used to configure an API for "Service A". In the present example, configuration code unit 520 has an identifier of "ServiceA", an allow designation, and two different request matchers.

The first request matcher in the present example has two conditions for allowable requests, including a condition that a request method is to be "GET", and a condition that a URL path requested by a client device is to be "/foo". The second request in the present example also has two conditions for allowable requests, including a condition that a request method is to be "OPTIONS", and a condition that a URL path requested by a user device is to be "/foo". If both conditions of the first request matcher or if both conditions of the second request matcher are met, for example, a content request can be allowed for "Service A".

Configuration code unit 522, for example, can be used to configure an API for "Service B". In the present example, configuration code unit 522 has an identifier of "ServiceB", a block designation, and a single request matcher. The single request matcher in the present example has a single condition for blocking requests, which specifies that a user request for a URL path of "private" is to be blocked. If the condition of the request matcher is met, for example, a content request can be blocked for "Service B".

Configuration code unit 524, for example, can be used to configure an API for "Service N". In the present example, configuration code unit 524 has an identifier of "ServiceN", an allow designation, and three different request matchers. The first request matcher in the present example has a condition that specifies that a user request that includes an API key of "123" is to be allowed. The second request in the present example has a condition that specifies that a user request that includes an API key of "456" is to be allowed. The third request in the present example has a condition that specifies that a user request that includes an API key of "789" is to be allowed. If a condition of any of the request matchers are met, for example, a content request can be allowed for "Service N".

Referring again to FIG. 2, if the configuration code units have been successfully validated, all of the configuration code units can be aggregated (214). In the present example, the configuration server 104 can use the configuration code aggregator 124 to generate a single validated/aggregated configuration code unit 134 that includes computer code of each of the validated interface configuration code units 130*a-n*. In various implementations, an aggregated configuration code unit can be maintained as a file, maintained in a database, and/or maintained in memory. In some implementations, aggregating the various configuration code units can include generating a single aggregated code unit that includes each of the configuration code units for configuring each service, in a separate respective section of the single aggregated code unit. For example, a section for configuring an API for "Service A" can be followed by a section for configuring an API for "Service B", which can be followed by a section for configuring an API for "Service N". In some implementations, aggregating the various configuration code units can include collapsing or expanding one or more code sections. For example, a request matcher in a configuration code unit may use fewer than all possible supported settings. In the present example, aggregating the configuration code units can include expanding each configuration code unit by listing each supported setting for a request matcher, along with a variable specified in the configuration code unit, or along with an empty string or another sort of placeholder (if a variable was unspecified).

The aggregated configuration code can be translated (216). For example, the configuration server 104 can use a configuration code translator 126 (e.g., an executable application) to translate the validated/aggregated configuration code unit 134 into a computer language that is different from that of the interface configuration code units 130*a-n* and to generate a translated configuration code unit 136. Referring to FIG. 5C, for example, validated/aggregated configuration code unit 540 and translated configuration code unit 542 are shown. In the present example, the validated/aggregated configuration code unit 540 is in a relatively high-level language (e.g., JavaScript Object Notation (JSON), or another suitable language), and the translated configuration code unit 542 is in a relatively low-level language (e.g., Varnish Configuration Language (VCL), or another suitable language). While the validated/aggregated configuration code unit 540 and the translated configuration code unit 542 in the present example are functionally equivalent, the code of code unit 540 is generally more understandable to novice programmers, whereas the code of code unit 542 is used by the platform server 106. Also, since the translated configuration code unit 542 in the present example is not directly maintained by any code developers (and is instead generated in response to code changes of the interface configuration code units 130*a-n*), code developers are freed from the burdensome task of having to understand and debug a monolithic code file that is being worked on by other code developers. Further, a size of a code base used by the platform server 106 can be reduced by eliminating redundant code.

During stage (D), the translated configuration code can be provided for a platform server (218). For example, the configuration server 104 can provide the translated configuration code unit 136 to the platform server 106, where it can be used to configure multiple different services provided by the platform server for the organization. In the present example, respective APIs for each of Service A, Service B, and Service N are configured for the configuration server 104, which can maintain the respective configuration settings in a configuration settings data store 112. As another example, the translated configuration code 136 can be stored directly in the configuration settings data store 112.

During stage (E), the platform server 106 can handle requests from various user devices. For example, user device 108*a* can submit, to the platform server 106, request 138*a* (e.g., for Service A), user device 108*b* can submit request 138*b* (e.g., for Service B), and user device 108*n* can submit request 138*n* (e.g., for Service N). Upon receiving each request, for example, the platform server 106 can reference the respective configuration settings for the requested service (e.g., from the configuration settings data store 112), and can determine whether to allow or deny the request based on the configuration settings. As another example, the platform server 106 can execute the translated configuration code 136 to handle the incoming requests from user devices 108*a-n*.

Figure 6:
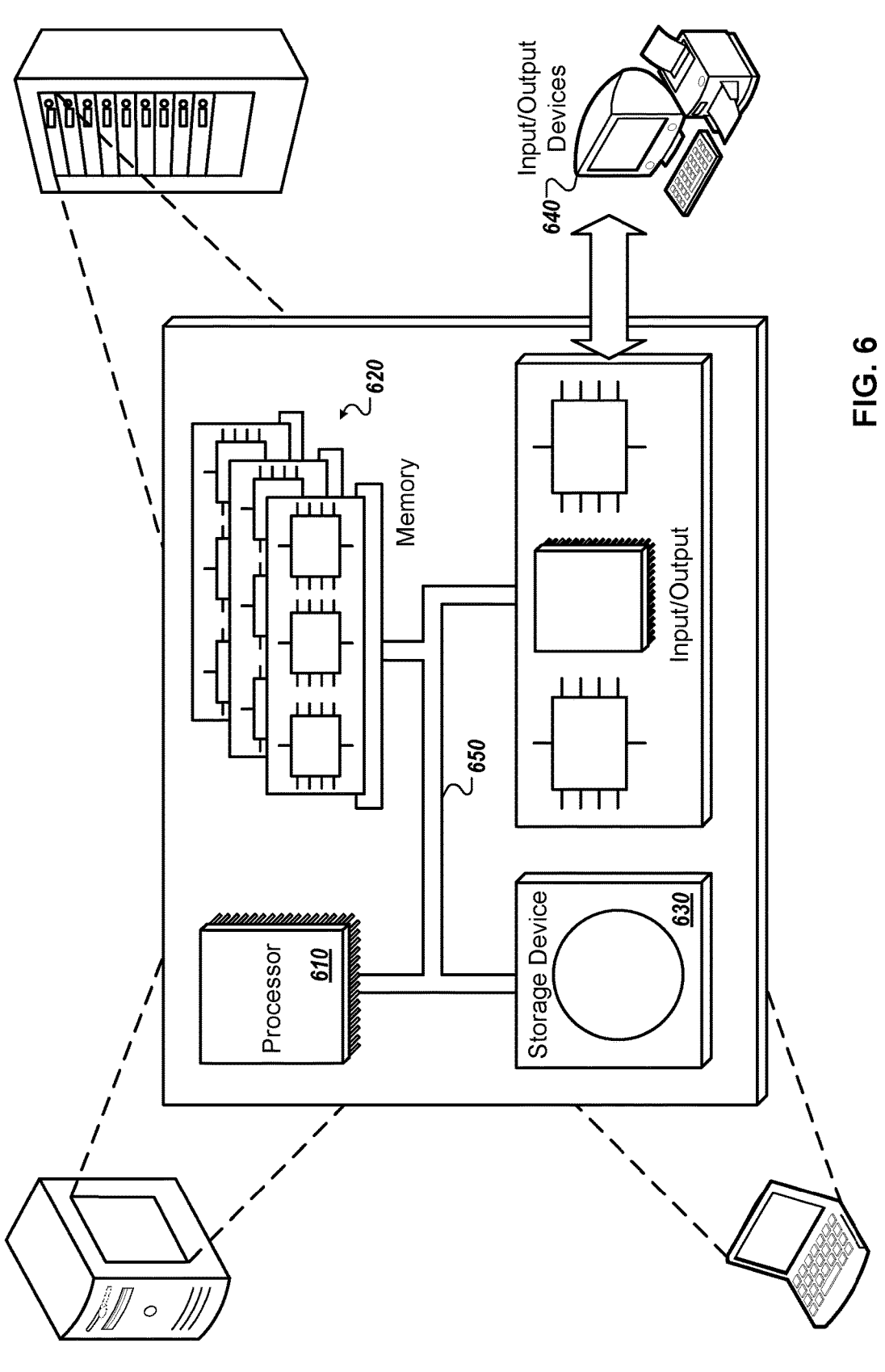
FIG. 6 is a schematic diagram that shows an example of a computing system.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASIC s (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A computer-implemented method, comprising:

receiving, at a configuration code repository and from a code generation device, data that corresponds to a change to interface configuration code of a service of a platform, wherein the platform is configured to provide multiple different services, and wherein the configuration code repository is configured to maintain, for each service of the platform, a respective interface configuration code unit that specifies configuration settings for the service;

detecting, by a configuration server, that the change has been made to the interface configuration code of the service of the platform;

in response to detecting that the change has been made to the interface configuration code of the platform:

retrieving, by the configuration server and from the configuration code repository, each respective interface configuration code unit of each of the multiple different services;

executing, by the configuration server, a configuration code validator that validates each respective interface configuration code unit of each of the multiple different services;

in response to successful validation of all of the respective interface configuration code units, (i) executing, by the configuration server, a configuration code aggregator that generates a single aggregated configuration code unit that includes computer code for configuring each of the multiple different services, based on each of the respective interface configuration code units, thereby reducing an amount of redundant code in the single aggregated configuration code unit, and (ii) executing, by the configuration server, a configuration code translator that translates the single aggregated configuration code unit into a computer language that is different from that of the respective interface configuration code units, and that generates a translated configuration code unit; and transmitting, by the configuration server and to a platform server, the translated configuration code unit;

modifying, by the platform server, configuration settings of each of the multiple different services of the platform, based on the translated configuration code unit;

concurrently receiving, by the platform server and from multiple different client devices, respective requests for content that are to be handled by the multiple different services of the platform; and in response to receiving each respective request for content from each respective client device, (i) referencing configuration settings for a service that is to handle the respective request for content, (ii) identifying an internet protocol (IP) address of the respective client device, and (iii) allowing or denying the respective request for content by the service, based at least in part on the referenced configuration settings for the service and the IP address of the respective client device.

2. The computer-implemented method of claim 1, wherein the platform is a content delivery network platform.

3. The computer-implemented method of claim 1, wherein each respective interface configuration code unit of the interface configuration code is maintained in a different, uniquely named file, of a common network directory.

4. The computer-implemented method of claim 1, wherein executing the configuration code validator that validates each respective interface configuration code unit comprises determining whether computer code of the respective interface configuration code unit has a valid syntax.

5. The computer-implemented method of claim 1, wherein executing the configuration code validator that validates each respective interface configuration code unit comprises determining, for the respective interface configuration code unit, whether each configuration setting specified by the respective interface configuration code unit is included in a set of supported configuration settings for the platform.

6. The computer-implemented method of claim 5, wherein the set of supported configuration settings for the platform is a subset of all configurations settings that are available in a computer language of the respective interface configuration code unit.

7. The computer-implemented method of claim 1, wherein each respective interface configuration code unit for each service of the platform includes at least one request matcher, wherein a given request matcher for a given service is defined by one or more configuration settings.

8. The computer-implemented method of claim 7, wherein executing the configuration code validator that validates each respective interface configuration code unit comprises determining, for the respective interface configuration code unit, whether at least two different configuration settings used to define a same request matcher are mutually exclusive.

9. The computer-implemented method of claim 1, wherein executing the configuration code validator that validates each respective interface configuration code unit comprises determining, for the respective interface configuration code unit, whether each access control list specified by the respective interface configuration code unit has been defined as a valid access control list.

10. The computer-implemented method of claim 1, wherein the translated configuration code unit includes computer code of a lower-level language than that of each of the respective interface configuration code units.

11. The computer-implemented method of claim 1, wherein each of the respective interface configuration code units includes JavaScript Object Notation (JSON) code, and the single aggregated configuration code unit includes Varnish Configuration Language (VCL).

12. A computer system comprising:

one or more data processing apparatuses including one or more processors, memory, and storage devices storing instructions that, when executed, cause the one or more processors to perform operations comprising:

receiving, at a configuration code repository and from a code generation device, data that corresponds to a change to interface configuration code of a service of a platform, wherein the platform is configured to provide multiple different services, and wherein the configuration code repository is configured to maintain, for each service of the platform, a respective interface configuration code unit that specifies configuration settings for the service;

detecting, by a configuration server, that the change has been made to the interface configuration code of the service of the platform;

in response to detecting that the change has been made to the interface configuration code of the platform:

retrieving, by the configuration server and from the configuration code repository, each respective interface configuration code unit of each of the multiple different services;

executing, by the configuration server, a configuration code validator that validates each respective interface configuration code unit of each of the multiple different services;

in response to successful validation of all of the respective interface configuration code units, (i) executing, by the configuration server, a configuration code aggregator that generates a single aggregated configuration code unit that includes computer code for configuring each of the multiple different services, based on each of the respective interface configuration code units, thereby reducing an amount of redundant code in the single aggregated configuration code unit, and (ii) executing, by the configuration server, a configuration code translator that translates the single aggregated configuration code unit into a computer language that is different from that of the respective interface configuration code units, and that generates a translated configuration code unit; and transmitting, by the configuration server and to a platform server, the translated configuration code unit;

modifying, by the platform server, configuration settings of each of the multiple different services of the platform, based on the translated configuration code unit;

concurrently receiving, by the platform server and from multiple different client devices, respective requests for content that are to be handled by the multiple different services of the platform; and in response to receiving each respective request for content from each respective client device, (i) referencing configuration settings for a service that is to handle the respective request for content, (ii) identifying an internet protocol (IP) address of the respective client device, and (iii) allowing or denying the respective request for content by the service, based at least in part on the referenced configuration settings for the service and the IP address of the respective client device.

13. The computer system of claim 12, wherein the platform is a content delivery network platform.

14. The computer system of claim 12, wherein each respective interface configuration code unit of the interface configuration code is maintained in a different, uniquely named file, of a common network directory.

15. The computer system of claim 12, wherein executing the configuration code validator that validates each respective interface configuration code unit comprises determining whether computer code of the respective interface configuration code unit has a valid syntax.

16. The computer system of claim 12, wherein executing the configuration code validator that validates each respective interface configuration code unit comprises determining, for the respective interface configuration code unit, whether each configuration setting specified by the respective interface configuration code unit is included in a set of supported configuration settings for the platform.

17. The computer system of claim 16, wherein the set of supported configuration settings for the platform is a subset of all configurations settings that are available in a computer language of the respective interface configuration code unit.

18. The computer system of claim 12, wherein each respective interface configuration code unit for each service of the platform includes at least one request matcher, wherein a given request matcher for a given service is defined by one or more configuration settings.

19. The computer system of claim 18, wherein executing the configuration code validator that validates each respective interface configuration code unit comprises determining, for the respective interface configuration code unit, whether at least two different configuration settings used to define a same request matcher are mutually exclusive.

20. The computer system of claim 12, wherein executing the configuration code validator that validates each respective interface configuration code unit comprises determining, for the respective interface configuration code unit, whether each access control list specified by the respective interface configuration code unit has been defined as a valid access control list.

21. The computer system of claim 12, wherein the translated configuration code unit includes computer code of a lower-level language than that of each of the respective interface configuration code units.

22. The computer system of claim 12, wherein each of the respective interface configuration code units includes JavaScript Object Notation (JSON) code, and the single aggregated configuration code unit includes Varnish Configuration Language (VCL).

* * * * *